H. TOBLER.
ELECTROLYTIC APPARATUS.
APPLICATION FILED DEC. 30, 1921.
Reissued Feb. 28, 1922. 15,297.
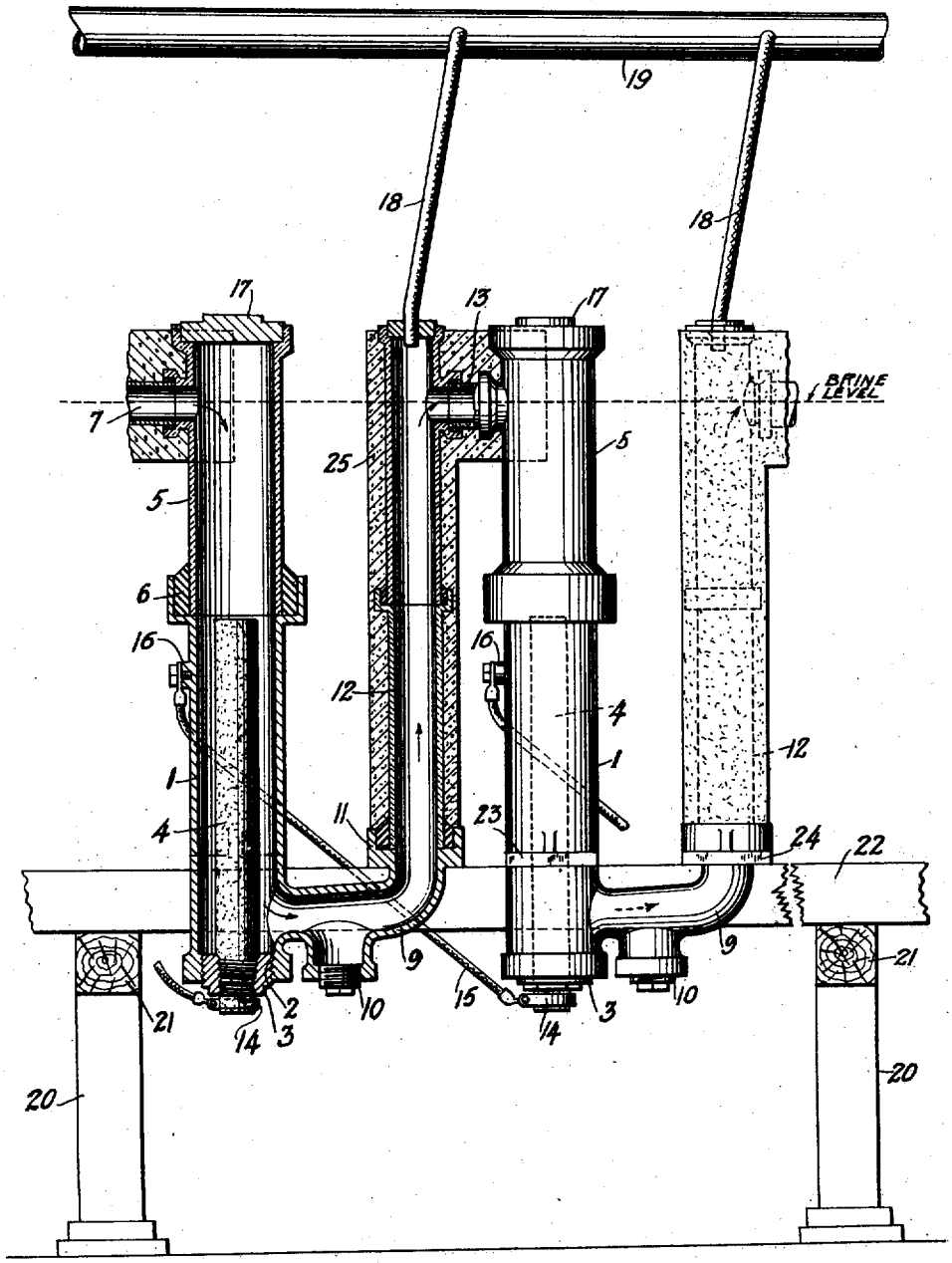
INVENTOR
Henri Tobler
BY
Pennie Davis Marvin & Edmonds
ATTORNEYS

UNITED STATES PATENT OFFICE.

HENRI TOBLER, OF HACKENSACK, NEW JERSEY, ASSIGNOR TO AMERICAN BROMINE COMPANY, OF MAYWOOD, NEW JERSEY, A CORPORATION OF NEW JERSEY.

ELECTROLYTIC APPARATUS.

15,297. Specification of Reissued Letters Patent. Reissued Feb. 28, 1922.

Original No. 1,380,853, dated June 7, 1921, Serial No. 422,431, filed November 8, 1920. Application for reissue filed December 30, 1921. Serial No. 526,041.

*To all whom it may concern:*

Be it known that I, HENRI TOBLER, a citizen of the United States, residing at Hackensack, in the county of Bergen, State of New Jersey, have invented certain new and useful Improvements in Electrolytic Apparatus; and I do hereby declare the following to be a full, clear, and exact description of the invention, such as will enable others skilled in the art to which it appertains to make and use the same.

The apparatus of the present invention is suitable for the electrolysis of brine, as in producing hypochlorites, and is particularly suitable for use on natural brines, such as those of Michigan and the Ohio river valley, when a halogen such as bromin is to be recovered from the brine by electrolytic oxidation followed by known methods of separation, purification and absorption.

The apparatus is so constructed that when bromin alone is the desired halogen, the electrolysis can be conducted in such a manner as to have a recovery of bromin well above 95%. The apparatus is capable of exact regulation of electrical input to brine flow, so that over-oxidation of the brine can be accurately gaged to the needs of any particular brine, thus insuring complete liberation of all of the bromin without the liberation of more chlorin than is useful in setting free the bromin from its chemical compounds in the brine.

The apparatus is of simple and cheap construction; can be built in standard units easily interchangeable; can be assembled to suit the voltage of the source of electricity, and any unit is readily replaceable at will if occasion should require.

The electrical elements are effectively insulated, the brine containers and conduits are not subject to rapid destruction either from electrolysis or otherwise, and all are adequately protected against leakage. The electrodes and other surfaces subject to normal electrolytic corrosion can be easily renewed with but short interruptions to the operation of the apparatus, and all of the working parts can be readily and thoroughly cleaned of the sediment which ordinarily collects in an apparatus used for the electrolytic oxidation of a natural brine.

In the accompanying drawing, there is illustrated one embodiment of the apparatus comprising a series of containers each adapted to serve as cathode of an electrolytic cell, and each provided with a carbon anode preferably positioned concentric with the container. Between each anode and its container, the brine to be electrolyzed is circulated. Pipes or conduits of non-conducting material form tortuous paths from one container to the next, so that the brine undergoes progressive electrolysis in the several units or cells of the apparatus. The number of cells thus connected together in series can be proportioned to the voltage of the electrical energy conveniently available; but for a 115 to 125 volt direct current supply, it is preferable to use 24 cells thus connected in series. The several electrolytic cells being connected in electrical series are at different electrical potentials, and the quantity of current sent through the series is proportioned to the degree of the electrolysis or oxidation desirable with any particular brine. But for the liberation of bromin from its chemical combinations in natural brines, such as those of Michigan and of the Ohio river valley, it is preferable to use a current density which will slightly over-electrolyze the brine so far as concerns its bromin content, or, in other words, will yield some free chlorin together with substantially all of the bromin.

The single figure of the drawing is an elevation partly in section of two units of a series of electrolytic cells through which a bromin-bearing brine may be passed for electrolytic oxidation preparatory to recovery of the bromin from the brine.

Each unit or cell of the electrolytic apparatus illustrated in the accompanying drawing as the preferred embodiment of the present invention, comprises a container 1, which is of tubular shape, vertically disposed, and consists of a single iron casting terminating at the bottom in a threaded opening 2, adapted to receive a threaded bushing 3 of hard rubber into which is threaded or otherwise suitably secured an anode 4 of carbon, preferably graphitic carbon, of cylindrical shape. Thus, there is left between the cylindrical and centrally positioned anode and the cast iron container which is to serve as cathode, a vertical annular space through which brine can be circulated in the desired direction, and can be electrolyzed by current of suitable voltage passing from anode to cathode through the brine. Each cast iron container is surmounted by a T-fitting 5 of tile, or like insulating material, with a calked bell-joint 6 between the tile and the metal container to insure a fluid-tight connection which can be taken apart in case the apparatus is to be repaired. The tile fitting for the first container of the series is equipped with an inlet conduit 7 through which the raw brine is supplied to the apparatus, this inlet being so arranged as to maintain a brine level throughout the apparatus well above all metal parts, as, for instance, at the level indicated by a dotted line in the drawing.

At the bottom of fitting 1 and cast integrally therewith is an elbow or extension 9, the lower leg of which is provided with a clean-out opening closed by a plug 10, and the upper leg of which is connected through a bell-joint 11 with a pipe or conduit 12 of insulating material, such as tile pipe, which by means of a coupling 13 communicates with the inlet opening of the next tile fitting 5, thereby forming a tortuous path for brine from the bottom of one container to the top of the next. This insures free circulation of the brine throughout the series of electrolytic cells, but limits to a negligible amount the leakage of electrical energy from one anode to more remote cathodes of the series.

Each carbonaceous anode is provided with an encircling spring-clip 14 to the bolt of which is attached a cable 15 by which the electrical current is supplied to the anode. Each cast iron cathode is provided with a binding-post 16 to which one of these cables 15 is connected, so that direct current entering the first anode 4 from the dynamo, or other source of electrical energy, passes through the brine to the metal container of the cell, and then out through cable 15 to the next anode, and so on throughout the entire series.

The chemical effect of electrolysis on a natural bromin-containing brine is, first, to liberate the bromin from its chemical combinations in the brine, and, second, to liberate the chlorin from its chemical combinations, the voltage of decomposition being somewhat higher for chlorids than for bromids. The free bromin remains for the most part mechanically absorbed in the brine, and the free chlorin will chemically react on any unreduced bromids in the brine to liberate an equivalent quantity of free bromin. Consequently, in the electrolysis of a natural brine in this apparatus, some of the resulting free bromin may come from electrolysis directly, and some may come as a secondary product, resulting from the electrolysis of chlorids. The apparatus illustrated in the drawing is especially conducive to this secondary action, for any bubbles of chlorin liberated on the anode must pass upward through a considerable column of downwardly moving brine before they can escape at the surface of the brine. There is, therefore, good opportunity for intimate contact between the chlorin and the brine, and much of the chlorin therefore is used in desirable manner when freed bromin is the ultimate product.

Inasmuch, however, as the current density may be such as to liberate some free chlorin and even some free bromin at the top of each column of brine, I provide each tile fitting 5 with a removable wooden cover 17 to prevent the escape of these gases into the cell room. Also, there is provided at the top of each of the conduits 12, a vent pipe 18, which may be a rubber hose leading to a hollow wooden log 19, whereby the gases may be conveyed away for use in any desired manner.

The group of electrolytic cells is supported on a frame-work comprising tile pipes 20 standing on end, with their bells down, surmounted by timbers 21 on which are placed wooden beams 22 impregnated with asphalt, or otherwise treated to render them more resistant to salt brine. Each cast iron container 1 is provided on either side with an outwardly extending and integral foot 23 resting on the top of one of beams 22. And, similarly, each extension or elbow 9 has an integral foot 24 on either side of its bell end to rest on beam 22. This mode of mounting keeps all of the apparatus in proper position with the cathodes well insulated one from another. I find it advantageous to sometimes inclose the tile pipe 12, and its coupling 13, in an envelop 25 of concrete cast about these members after they have been installed in position. This concrete, as shown in the drawing, covers and reinforces the joints of the tile pipe and rigidly anchors the pipe to the adjacent pipe 5. When the joints are thus reinforced, there is little or no danger of the escape of gaseous bromin into the cell room, and all of the bromin freed from the brine is either carried along dissolved in the brine, or escapes through vent pipes 18 into the main pipe 19, from which it can be sucked out for use elsewhere in the system.

After the natural or other brine has thus been circulated through the apparatus and electrolyzed, and consequently oxidized to the desired extent, it may be conveyed away to suitable apparatus for the separation of the bromin from the brine, for its purification from chlorin, and for its ultimate absorption in well known manner, to produce marketable bromin solutions, or salts recovered from such solutions, as, for instance, sodium and potassium bromid.

I am aware that the form of the apparatus and its method of use herein set forth may be varied in many particulars, and I contemplate such variations as reasonably come within the spirit of my inventon, as above described, and as defined by the claims appended hereto.

I claim:—

1. Electrolytic apparatus comprising a series of metal containers adapted to serve as cathodes at different electrical potentials, means for circulating brine by a tortuous path from one container to another, a carbon anode positioned in each container and about which said brine circulates during electrolysis, each of said containers having an integral extension with a clean-out opening through which sediment deposited from the brine may be flushed out.

2. Electrolytic apparatus comprising a series of vertical tubular iron containers adapted to serve as cathodes at different electrical potentials, means for circulating brine by a tortuous path from one container to another, a part of each tortuous path being of non-conducting material and the remainder being of iron cast integral with its cathode.

3. Electrolytic apparatus comprising a series of vertical cast iron containers adapted to serve as cathodes, means for circulating brine by a tortuous path from the lower part of one container into the upper part of the next container, a part of said path consisting of tile pipe and another part consistng of iron pipe cast integral with the adjacent cathode.

4. Electrolytic apparatus comprising a series of vertical containers adapted to serve as cathodes at different electrical potentials, an insulating bushing at the bottom of each container, a carbon anode mounted in each bushing and about which brine may be circulated, a tubular extension integral with said cathode and provided with a clean-out opening, and an insulating pipe connected with said extension and with the upper part of the next container to serve as a tortuous path for the circulation of brine, substantially as described.

5. Electrolytic apparatus comprising a series of tubular cast iron containers adapted to serve as cathodes, a tile pipe surmounting each container, a pipe for circulating brine by a tortuous path from the lower part of one container into the tile pipe which surmounts the next container, a carbon electrode in each container to form therewith an electrolytic cell, means electrically connecting said cells in series to progressively electrolyze the brine as it passes through the series of containers, and means for venting the top of each container.

6. Electrolytic apparatus comprising a pluarlity of vertical containers adapted to serve as cathodes in an electrical series, means for circulating brine by a tortuous path from one container to another, an anode positioned in each container about which said brine circulates during electrolysis, and gas exhausting means above the brine level in each container to carry away gases liberated by electrolysis and not absorbed by the electrolyte.

7. Electrolytic apparatus comprising a pluarlity of cast iron containers adapted to serve as cathodes in an electrical series and each provided with supporting feet, a pair of timbers on which said feet rest, an extension integral with each container and provided with a clean-out opening, an anode in each container, and means for circulating brine by a tortuous path from one container into the top of an adjacent container, substantially as described.

8. Electrolytic apparatus comprising a series of metal containers adapted to serve as cathodes at different electrical potentials, means for circulating brine by a tortuous path from one container to another, a carbon anode positioned in each container and about which said brine circulates during electrolysis, a pair of timbers on which said containers are supported, and means connecting said anodes and cathodes in series relation, substantially as described.

In testimony whereof I affix my signature.

HENRI TOBLER.